United States Patent [19]

Gukkenberger et al.

[11] Patent Number: 4,788,762

[45] Date of Patent: Dec. 6, 1988

[54] METHOD OF MANUFACTURING A MAGNETIC HEAD FOR A VIDEO MAGNETIC TAPE APPARATUS

[75] Inventors: Horst Gukkenberger, Zirndorf; Karl Eberle, Cadolzburg; Karola Weigel-Krengel, Nuremberg, all of Fed. Rep. of Germany

[73] Assignee: U.S. Philips Corporation, New York, N.Y.

[21] Appl. No.: 88,764

[22] Filed: Aug. 24, 1987

[30] Foreign Application Priority Data

Aug. 29, 1986 [DE] Fed. Rep. of Germany ....... 3629519

[51] Int. Cl.⁴ .............................................. G11B 5/42
[52] U.S. Cl. .......................................... 29/603; 65/43; 360/127
[58] Field of Search ............. 29/603; 65/43; 360/125, 360/126, 127

[56] References Cited

U.S. PATENT DOCUMENTS

| 3,795,954 | 3/1974 | Alex et al. | 29/603 |
| 4,238,215 | 12/1980 | Yokoyama et al. | 65/43 |
| 4,642,719 | 2/1987 | Morita et al. | 360/126 |
| 4,665,612 | 5/1987 | Damen et al. | 29/603 |

FOREIGN PATENT DOCUMENTS 0128586 12/1984 European Pat. Off. .

*Primary Examiner*—Carl E. Hall
*Attorney, Agent, or Firm*—F. Brice Faller

[57] ABSTRACT

A method for manufacturing a video magnetic head in which two soft magnetic core halves (2a, 2b) of amorphous metal are connected via a non-magnetic gap (5) and the core halves are bilaterally supported by core supports (3a, 3b; 4a, 4b) of ferrite. The core halves with the core supports are combined to a core compound by melting a thin low melting point glass layer (7) which is sputtered on the core halves. The combination process is effected by means of simultaneous influence of temperature and pressure.

10 Claims, 1 Drawing Sheet

METHOD OF MANUFACTURING A MAGNETIC HEAD FOR A VIDEO MAGNETIC TAPE APPARATUS

BACKGROUND OF THE INVENTION

The invention relates to a method of manufacturing a magnetic head for a video magnetic tape apparatus in which two soft magnetic core halves of amorphous metal are connected via a non-magnetic gap. Each core half is bilaterally supported by two core supports of a soft magnetic ferrite and each core support has an inclusion of non-magnetic material in the gap area.

In video magnetic tape apparatus magnetic heads are used in large numbers. The heads have small gap widths and other small dimensions. The difficulties in the manufacture of such a small magnetic head are that the magnetic head (video head) is to be manufactured at low cost and that the annular core provided with a gap must be given a sufficient mechanical stability. A method of manufacturing a magnetic head with amorphous metallic core halves is known whose mechanical stability is achieved by non-magnetic core supports and a binding agent connecting all the head parts. The non-magnetic gap separates the two core halves. One core half has a free space which is provided with coil windings. The core halves are connected to the core supports by means of connection layers. These layers preferably consist of a silicon resin which cures readily at a low temperature.

The use of such a binding agent has the drawback that the bonds are not sufficiently stable and that, particularly when further processing the compound core and in the case of temperature and humidity fluctuations, shifts of the core parts may be the result.

SUMMARY OF THE INVENTION

According to the invention the connection layer between the core halves and the core supports is realized in such a manner that the compound core obtained by this connection has a mechanical stability which complies with all processing and operating requirements.

The core halves are connected to the core supports by providing a bonding layer bilaterally on the sides of the core halves, providing a thin glass layer melting at a low temperature between the core halves and the core supports, softening the glass layer at a predetermined temperature which is below the recrystallization temperature of the amorphous foil of the core halves, and soldering the core halves and core supports together to a compound core by means of pressure.

DETAILED DESCRIPTION OF THE PREFERRED EMBODIMENTS

Figure 1:
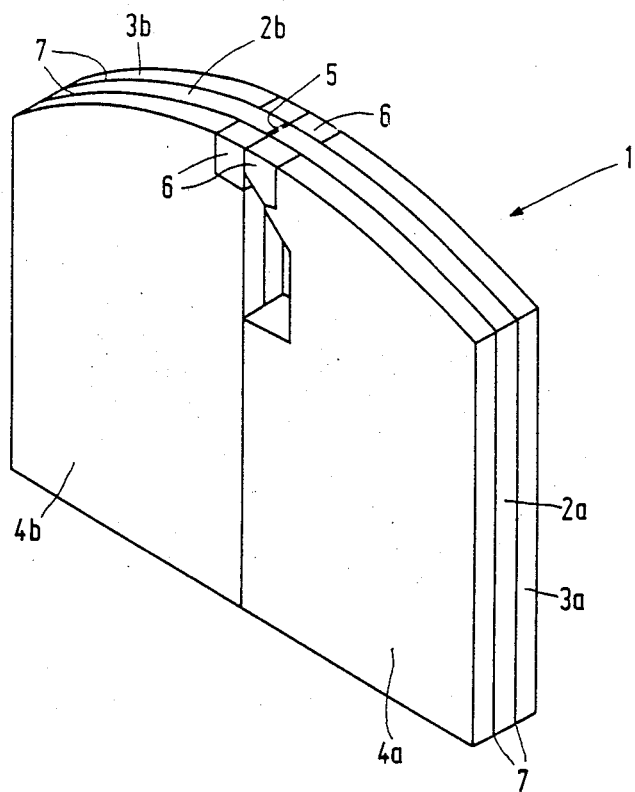
FIG. 1 is a perspective of the complete magnetic core.

FIG. 1 shows how the complete magnetic core, as a core compound of the magnetic head, is soldered from single parts. The magnetic core in the form of a compound core 1 includes the two core halves 2a, 2b which are made of amorphous metal in a foil form and it comprises the core supports 3a, 3b and 4a, 4b of soft magnetic ferrite arranged on either side of the core halves. The core halves, and the core supports in define a non-magnetic gap 5 therebetween. The core supports have a glass inclusion 6 in the gap area. A glass layer 7 connecting the parts in a mechanically stable manner is provided between the core halves and the core supports. The glass has a melting point less than 400° C.

The glass layer is very thin and is preferably sputtered only on the core halves. The core halves are pretreated, if necessary, for example by vapour depositing a bonding layer of $SiO_2$, $TiO_2$, Ag or Ti before the glass layer is provided.

The parts thus pretreated (providing the bonding layer and providing the thin glass layer) are preferably joined to form a stack which is realized by alternately coating core halves and core supports. The stack is heated and when the maximum temperature corresponding to the softening point of the thin glass layer on the core halves is reached, the stack is subjected to a high pressure and is compressed. After a gradual decrease of pressure and temperature the parts of the stack are glass-soldered. The stack is subsequently processed by providing recesses for the glass inclusions 6 and the wire coil not shown, whilst the gap surface is processed. The core block half thus obtained from the stack is combined (soldered) with a further core block half to an overall block while forming a non-magnetic gap, and single core compound parts are sliced from this overall block. Subsequently, the tape contact face is finished and the wire windings are inserted.

What is claimed is:

1. A method of manufacturing a magnetic head for a video magnetic tape apparatus, the head comprising two soft magnetic core halves of amorphous metal having gap surfaces defining a non-magnetic gap therebetween, each core half being supported on both sides by two core supports of a soft magnetic ferrite to form a compound core, said method comprising the following steps:
   providing a bonding layer on both sides of each core half,
   providing a thin glass layer between each core half and each core support, said thin glass layer softening at a temperature which is below the recrystallization temperature of the amorphous metal,
   joining each core half to a pair of core supports to form stacks,
   heating each stack to the softening temperature of the glass layers,
   subjecting each stack to pressure to solder the core halves to the core support.

2. A method as in claim 1 including
   stacking a plurality of core halves alternately with core supports to form two stacks which constitute half blocks during said joining step,
   connecting said half blocks to form an overall block,
   slicing said compound core from said overall block.

3. A method as in claim 1 including
   providing recesses in each stack on either side of said core half,
   providing glass inclusions in each recess,
   processing the gap surfaces of each core half.

4. A method as in claim 1 wherein the thin glass layers are provided by sputtering.

5. A method as in claim 1 wherein the thin glass layers are provided by vapor deposition.

6. A method as in claim 1 wherein the thin glass layers are provided on the core halves.

7. A method as in claim 1 wherein the thin glass layer melts at a temperature less than 400° C.

8. A method as in claim 1 wherein the bonding layer is a member of the group consisting of $SiO_2$, $TiO_2$, Ag, and Ti.

9. A method as in claim 8 wherein the bonding layer is provided by sputtering.

10. A method as in claim 8 wherein the bonding layer is provided by vapor deposition.

* * * * *